United States Patent
Shi (10) Patent No.: US 8,670,974 B2
(45) Date of Patent: Mar. 11, 2014

(54) ACQUISITION OF OUT-OF-VOCABULARY TRANSLATIONS BY DYNAMICALLY LEARNING EXTRACTION RULES

(75) Inventor: Lei Shi, Beijing (CN)

(73) Assignee: Yahoo! Inc., Sunnyvale, CA (US)

( * ) Notice: Subject to any disclaimer, the term of this patent is extended or adjusted under 35 U.S.C. 154(b) by 316 days.

(21) Appl. No.: 12/922,154

(22) PCT Filed: Sep. 25, 2009

(86) PCT No.: PCT/CN2009/001078
§ 371 (c)(1),
(2), (4) Date: Sep. 10, 2010

(87) PCT Pub. No.: WO2011/035455
PCT Pub. Date: Mar. 31, 2011

(65) Prior Publication Data
US 2011/0178792 A1    Jul. 21, 2011

(51) Int. Cl.
*G06F 17/28* (2006.01)
(52) U.S. Cl.
USPC ............... 704/2; 704/1; 704/3; 704/4; 704/5; 704/8; 715/264
(58) Field of Classification Search
USPC ......................................................... 704/2–8
See application file for complete search history.

(56) References Cited

U.S. PATENT DOCUMENTS

| 7,805,289 | B2 * | 9/2010 | Zhou et al. | 704/7 |
| 2008/0010056 | A1 * | 1/2008 | Zhou et al. | 704/8 |
| 2009/0182547 | A1 * | 7/2009 | Niu et al. | 704/2 |
| 2010/0138211 | A1 * | 6/2010 | Shi et al. | 704/3 |
| 2010/0241416 | A1 * | 9/2010 | Jiang et al. | 704/7 |

FOREIGN PATENT DOCUMENTS

| CN | 1452093 A | 10/2003 |
| CN | 1452101 A | 10/2003 |

OTHER PUBLICATIONS

The State Intellectual Property Office, The P.R. China, Office Action, in application No. PCT/CN2009/001078, dated Jul. 8, 2010, 9 pages.
Current Claims in Application No. PCT/CN2009/001078, dated Jul. 2010, 4 pages.

* cited by examiner

*Primary Examiner* — Lamont Spooner
(74) *Attorney, Agent, or Firm* — Hickman Palermo Truong Becker Bingham Wong LLP (57) ABSTRACT

A method and apparatus for identifying a set of bilingual term pairs, and from the set of bilingual term pairs, identifying a set of candidate patterns related to the layout of the bilingual term pairs in the bilingual webpage is provided. From the set of candidate patterns, one or more best patterns can be selected based on features identified in the candidate patterns. Using the one or more selected patterns, a set of translation pair candidates can be extracted. The translation pair candidates can be verified to determine the likelihood that each translation pair candidate is an accurate translation. Based on the verification, some or all of the translation pair candidates can be discarded as incorrect translations, and the remaining translation pair candidates can be identified as correct translation pairs.

20 Claims, 4 Drawing Sheets

蜘蛛侠(Spider-man)
哥伦比亚三星公司(Columbia Tristar, USA)
==========================================

托比•马奎 : Tobey Maguire

柯尔斯滕-邓斯特 : Kirsten Dunst

威廉-达福 : Willam Dafoe

詹姆斯-佛朗哥 : James Franco

克里夫-罗伯逊 : Cliff Robertson

山姆-雷米 : Sam Raimi

ACQUISITION OF OUT-OF-VOCABULARY TRANSLATIONS BY DYNAMICALLY LEARNING EXTRACTION RULES

This application is filed under 35 USC 371 and claims priority as a United States national stage application from prior PCT international application number PCT/CN2009/001078, having an international filing date of 25 Sep. 2009, the entire contents of which are hereby incorporated by reference for all purposes as if fully set forth herein.

FIELD OF THE INVENTION

Techniques of the present disclosure relate to extracting and utilizing term translation knowledge from bilingual webpages.

BACKGROUND

Query translation is a common technique utilized by Cross-Language Information Retrieval (CLIR) systems, which are designed to retrieve information written in a language different from the language of the user's query. CLIR systems are implemented into search engines, online dictionaries, and numerous other applications where translation of terms is desirable. For queries that contain out-of-vocabulary (OOV) terms that cannot be translated with a known database of translation pairs, system performance severely degrades. For example, an analysis of a query log for a Chinese search engine reveals that over 80% of the top 19,124 most frequently searched terms are not included in the typical Chinese-English dictionary. Due to the fact that the average length of web queries is short, such as two or three words, a single occurrence of an OOV term in a query can severely deteriorate the relevance of the retrieved search results. To deal with the OOV issue, a database of known translations not contained in a typical bilingual dictionary can be built, but new terms that require translation are constantly entering the lexicon. For example, terms corresponding to new products, new movie names, new entertainers, new slang words, etc. are constantly appearing. Manually adding translations for all of these new terms would require an impractically large amount of human effort.

Due in part to a sharp increase in the quantity of multilingual resources, the Internet has shown great promise as a resource for mitigating some of the limitations of CLIR systems. Recent research on automated web mining methods for term translations has primarily focused on utilizing mixed-language webpages where terms and their translations co-occur in the same page. In these bilingual webpages, translations for foreign terms occur with the foreign terms. Such pages are fairly common on the web for many language pairs such as Chinese-English, Japanese-English, Spanish-English, and many other language pairs.

A first approach to extracting the information contained in these webpages is the search-snippet-based method which leverages co-occurrence statistics from the search snippets of bilingual webpages. The search-snippet-based method involves searching for a foreign term in native language documents, and from the top-n returned snippets of the relevant bilingual pages, selecting as the translation of the foreign term, the native language string that has the highest co-occurrence count with the foreign term. This method is based on the assumption that the more frequently a term co-occurs with the foreign term in the snippets, the more likely that the foreign term is the translation. This approach is effective in mining high frequency term translations, but is ineffective for low frequency term translations because a search engine's relevance ranking algorithm typically is not based on the occurrence of a term's translation. Low frequency terms comprise a significant portion of the bilingual lexicon, thus severely limiting the effectiveness of the snippet-based mining scheme.

To complement search-snippet-based mining, a second approach can be utilized to identify term translations using one or a fixed set of predefined layout patterns of translation pairs on a bilingual webpage, e.g., a term followed by its translation surrounded by parentheses, 超人归来 (Superman). This second approach is able to discover low frequency term translation pairs as long as the pairs are captured by the patterns, but because webpages are created by different people, it is problematic to assume a finite set of patterns can cover every, or even most, bilingual webpages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques disclosed herein include identifying a set of bilingual term pairs in a bilingual webpage, and, from the set of bilingual term pairs, identifying a set of candidate patterns related to the layout of the bilingual term pairs in the bilingual webpage. From the set of candidate patterns, one or more best patterns can be selected based on features identified in the candidate patterns. Using the one or more selected patterns, a set of candidate translation pairs can be extracted from the bilingual webpage. The candidate translation pairs can be verified to determine the likelihood that each candidate translation pair is an accurate translation. Based on the verification, some or all of the candidate translation pairs can be discarded as incorrect translations, and the remaining candidate translation pairs can be identified as correct translation pairs.

Dynamically Learning Translations

Figure 1:
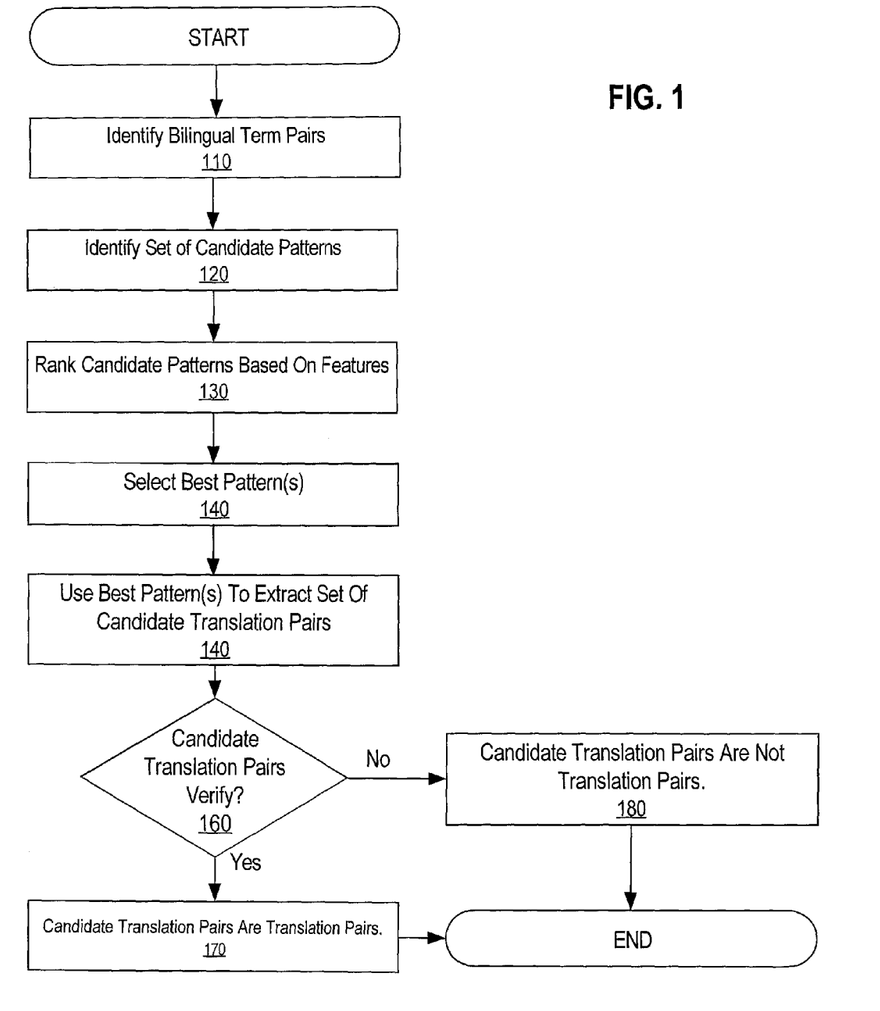
FIG. 1 shows a flowchart for a method embodying techniques described herein.

FIG. 1 shows a flow diagram of a method embodying techniques of the present disclosure. Within a bilingual webpage, a set of one or more bilingual term pairs can be identified (block 110). A bilingual term pair typically comprises a term in a first language and a term in a second language. In order to limit the number of bilingual term pairs identified within a webpage, a technique in an embodiment of the present invention includes limiting bilingual term pairs to terms in a first language and terms in a second language that are within a certain distance, or within a certain window, of each other, under the assumption that the translation for a term will typically be located relatively close to the term.

From the set of bilingual term pairs, a set of candidate patterns can be identified (block 120). In one embodiment, the set of candidate patterns is identified by storing a token associated with the word in the first language and a token associated with the word in the second language. Tokens are also stored for characters and html tags that occur between, prior to, or after the bilingual pair. For example, for the bilingual term pair "克里夫-罗伯逊 (Cliff Robertson)", a candidate pattern could be <L1> (<L2>), where "<L1>" represents the term in the first language, "<L2>" represents the term in the second language, "(" represents a character or set of characters that occurs between the bilingual terms, and ")" represents a character that occurs after the bilingual term pair. Even though the terms are different, the bilingual term pair "托比·马奎 (Tobey Maguire)" has the same layout pattern when 托比·马奎 is replaced by the token <L1> and Tobey Maguire is replaced by the token <L2>.

Features of each candidate pattern within the set of candidate patterns can be determined and used to rank the candidate patterns (block 130), and based on the rankings, one or more of the best candidate patterns, such as the most highly ranked pattern, can be selected (block 140). The identified features of each candidate pattern are typically features that either indicate a likelihood that the candidate pattern is a valid pattern or features that indicate a likelihood that the candidate pattern is an invalid pattern. The number and type of features used to rank the candidate patterns can be determined by machine learning techniques based on bilingual webpages with known translation layout patterns.

Using the selected candidate pattern, a set of candidate translation pairs can be extracted from the bilingual webpage (block 150). Candidate translation pairs are bilingual pairs with layouts that match the selected candidate pattern. A series of verification tests can be applied to candidate translation pairs (block 160). The candidate translation pairs that pass the verification tests (block 160, yes) can be identified as translation pairs (block 170, and the candidate translation pairs that do not pass the verification tests (block 160, no) can be discarded (block 180). In some embodiments, if more than a threshold number or more than a threshold percentage of the candidate translation pairs do not pass the verification tests, then all candidate translation pairs are discarded.

Identification of Bilingual Term Pairs

For purposes of explanation, various embodiments of an adaptive term translation extraction model utilizing techniques described herein will be explained with reference to Chinese-English bilingual webpages, where English terms are sporadically interlaced within Chinese text. It will be apparent, however, that such techniques can be applied to any combination of languages. Techniques include identifying translation pair layout patterns to facilitate translation extraction. Unlike approaches that employ a set of rigid global rules limited to identifying a finite set of pre-defined layout patterns, certain techniques described herein assume any pattern found in a webpage could potentially be used to extract translations. Techniques further include identifying the pattern most likely to identify correct translations based one or more features identified in the candidate patterns.

The techniques described herein can be used to mine bilingual webpages to build or add to a database of known translations. In other embodiments, the techniques described herein can be implemented in real-time in response to a user query containing an OOV term.

Figure 2A:
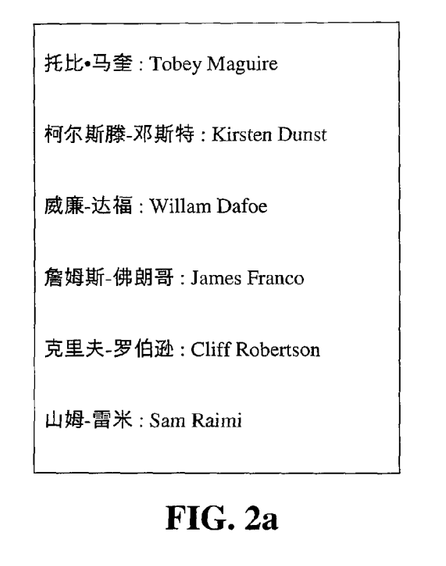
FIGS. 2a-b show example text boxes that each contain the same translation pairs but in different layout patterns.
Figure 2B:
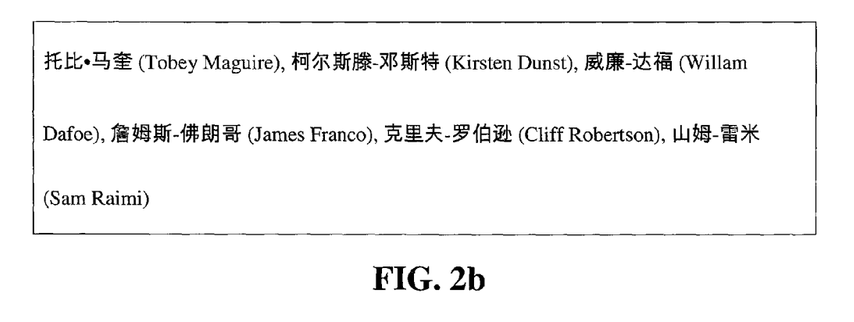

Techniques described herein exploit the fact that the authors of bilingual webpages exhibit a strong tendency to use similar patterns to layout term translation pairs in the same page. For example, if a webpage contains twenty translation pairs, then generally the layout pattern for all twenty translation pairs will be same, as opposed to different translation pairs having different layout patterns. Some webpages might use more than one layout pattern for different sets of translation pairs, but rarely will a webpage use random or only sporadically recurring patterns. FIG. 2a is an example of a text box that might be contained within a bilingual webpage. The text box contains a series of translation pairs separated by a colon. FIG. 2b is an example of a different text box containing the same translation pairs, but the layout pattern is different. Instead of having each translation pair separated by a colon and followed by a hard return, the English portion of the translation pair is enclosed in parentheses.

Referring to FIG. 2a, if 托比·马奎 : Tobey Maguire" and 柯尔斯滕-邓斯特 : Kirsten Dunst" are known translations contained in a database of translations, then it can be determined that the bilingual term pairs 克里夫-罗伯逊 : Cliff Robertson" and 山姆-雷米 : Sam Raimi" are likely translation pairs as well because both bilingual term pairs have the same layout as the known translation pairs. Even if none of the bilingual term pairs are known to be translation pairs, the fact that all these bilingual term pairs have the same pattern can still offer a strong clue that the bilingual term pairs might be translations. Hence, the identification of the corresponding pattern "Chinese: English" can still be leveraged to extract these candidate translation pairs in this particular page.

Bilingual term pairs consisting of an English term and a Chinese N-gram within a certain window size around the English term can be identified. Techniques of the present invention include limiting the identified bilingual term pairs to English terms and Chinese N-grams within a certain distance of one another on the assumption that a translation for a term is typically going to be located somewhat close to the term. Some of these bilingual term pairs may be translations and some may not, but initially all of the bilingual term pairs are identified as potential translations. A layout pattern for each of these bilingual pairs can be extracted as a candidate pattern. Duplicate patterns can be removed because many bilingual term pairs share the same patterns, and from the remaining patterns, a set of candidate patterns can be identified.

A probability of a particular candidate pattern being a valid pattern can be determined for each candidate pattern in the set by using a statistical ranking model based on features identified in the candidate patterns. The candidate pattern or patterns with the highest probability of being a valid pattern can be used to extract candidate translation pairs from the bilingual webpage.

Adaptive Pattern Learning

The layout pattern can be an important clue for accurately identifying term translations in bilingual webpages. Term translation pairs usually share the same layout patterns on the same page, which can be exploited to adaptively identify patterns for translation extraction. If a pair of terms follow the same pattern used in other bilingual term pairs on the same page, it is more likely that bilingual term pairs are translations and hence this pattern should be used to extract the matching pairs. To adaptively learn patterns from a page, candidate patterns for each identified bilingual term pair are identified.

Given a set of bilingual term pairs, patterns can be extracted for each bilingual term pair. In one embodiment, the English term and Chinese candidate term from a bilingual term pair are first converted into the generic tokens <eng> and <chi>. Characters and tags between the terms can be converted into non-generic tokens. For characters and tags adjacent to the pair, a delimiter of the original form is saved, with Chinese and English characters converted to the generic tokens <b_chi> and <b_eng> respectively. HTML tags can be used in the pattern as well, with only tag labels saved. For example, <a href="abcd.com"> would be saved as the token <a>.

Tokens between terms in a bilingual term pair can be saved in the tokens' original form rather than as the generic tokens <b_chi> or <b_eng>. This is because normally a term and the term's translation are close in distance, and the pattern, and hence the tokens between terms are likely to be identical from one translation pair to another. Replacing the characters and tags between the terms with the generic tokens <b_chi> or <b_eng> would identify a pattern too general to be distinctive. In contrast, the tokens before and after a translation pair are less likely to be identical from one translation pair to another. For example, a translation pair might always be followed by a Chinese character, but the particular Chinese character or word might be different from one translation pair to another.

Once a candidate pattern is identified, a determination is made as to whether other bilingual pairs in the webpage contain the same pattern. For example, the English term from a bilingual term pair can be matched with <eng>, and the Chinese candidate translation term from the bilingual term pair can be matched with <chi>. The tokens between, prior to, and next to the bilingual pairs can be compared with their corresponding positions in the candidate pattern. The tokens <b_chi> and <b_eng> can be matched with any Chinese and English words. If all or a minimum number of tokens of the pattern of the bilingual term pair can be matched with the candidate pattern, then that pattern of the bilingual term pair can be consider to match the candidate pattern. Otherwise, the pattern can be rejected as not matching.

Statistical Pattern Ranking Based on Features

A set of candidate patterns can be extracted from bilingual term pairs. From the set of candidate patterns, a best pattern for translation extraction can be selected based on the presence or absence of certain features. The features can make a pattern either more likely to be valid or less likely to be valid. The best pattern will typically be the pattern where the combination of all identified features produces the highest likelihood of being valid. In the context of this disclosure, the term "valid pattern" is not strictly limited to a correct pattern or the best pattern, but generally means a pattern that meets a threshold level of acceptability as determined by a system designer based on design preferences.

Figure 3:
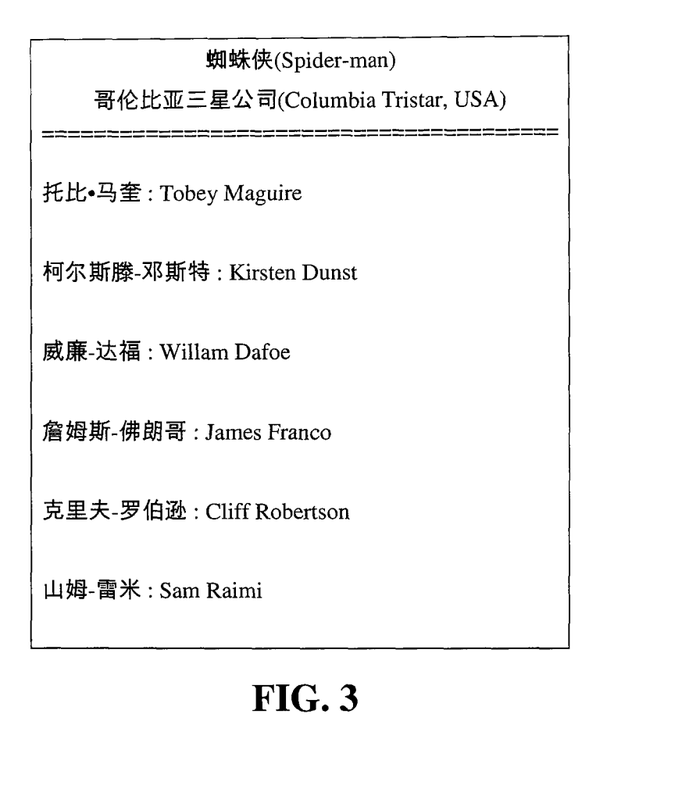
FIG. 3 shows an example of a text box containing sets of translation pairs with two different layout patterns.

An example of a feature that might indicate a valid or invalid pattern is the number or percentage of bilingual term pairs that match the candidate pattern. As bilingual webpage designers tend to use the same pattern to layout translation pairs throughout the same page, a number larger than a threshold value or a percentage larger than a threshold percentage of bilingual term pairs matching the same pattern can be indicative of a valid pattern. Conversely, a number or percentage of bilingual term pairs matching the same pattern lower than a threshold value can be indicative of an invalid pattern. For example, in FIG. 3 there are six bilingual term pairs (托比•马奎: Tobey Maguire," 柯尔斯滕-邓斯特: Kirsten Dunst," 詹姆斯-佛朗哥: Willam Dafoe," 詹姆斯-佛朗哥: James Franco," 山姆-雷米: Cliff Robertson" and 山姆-雷米: Sam Raimi") matching the "Chinese: English" pattern, compared to two bilingual candidate translation pairs (蜘蛛侠 (Spiderman)" and 哥伦比亚三星公司 (Columbia Tristar, USA)") matching the "Chinese (English)" pattern. Based on this particular feature, the "Chinese: English" pattern might be viewed as being a better pattern than the "Chinese (English)" pattern.

Another example of a feature that might indicate a valid pattern is a high number or high ratio of bilingual term pairs that can be verified according to a database of known translations. Alternatively, a high number or high ratio of bilingual term pairs that cannot be verified by a database of known translations might indicate an invalid pattern. For example, bilingual term pairs 托比•马奎: Tobey Maguire" and 柯尔斯滕-邓斯特: Kirsten Dunst" being contained in a database of known translations is a feature that might increase the likelihood of the "Chinese: English" pattern being identified as a valid pattern.

Another example of a feature that might be used to indicate a valid or invalid pattern is the average translation probability of the bilingual term pairs associated with the pattern. Translation probability can be computed using translation probability algorithms currently known in the art. The average translation probability can identify the probability of each bilingual term pair being an accurate translation without the candidate translation pair being affirmatively identified in a database of known translations. For example, translation probability can be based on the presence of accurately translated words within larger terms or other indicia known to be indicative of an accurate translation.

Another example of a feature that might be used to indicate a valid or invalid pattern is the average transliteration score of matching bilingual term pairs. A transliteration score measures pronunciation similarities for terms translated based on pronunciation instead of meaning. Bilingual term pairs with a high transliteration score can be indicative of a valid pattern, while bilingual term pairs with a low transliteration score can be indicative of an invalid pattern.

Another example of a feature that might be used to indicate a valid or invalid pattern is the average length similarity of bilingual term pairs. Translation pairs tend to have proportional length from one language to another. Therefore bilingual term pairs with proportional length can be indicative of a valid pattern, while large variances in length can be indicative of an invalid pattern.

Another example of a feature that might be used to indicate a valid or invalid pattern is the distance between bilingual term pairs. Translation pairs tend to occur relatively close to one another, so a large distance between bilingual term pairs can be indicative of an invalid pattern.

Another example of a feature that might be used to indicate a valid or invalid pattern is web co-occurrence. Translation pairs frequently occur in many bilingual webpages. Therefore, a bilingual term pair identified in a particular bilingual webpage, also co-occurring in other bilingual webpages, can be indicative that the bilingual term pair is a translation pair, which is also indicative of the candidate pattern associated with that bilingual term pair being a valid pattern.

Another example of a feature that might be used to indicate a valid or invalid pattern is context similarity. For example, the name of a famous athlete will generally occur in the same context regardless of language. For example, in monolingual webpages, the name of a famous basketball player will frequently be contained in close proximity to generic words such as "athlete" and "basketball" but also in close proximity to other words and phrases such as the name of the city where the player plays, names of the player's teammates, and the player's team name. Context terms for each term in a bilingual term pair can be identified from monolingual webpages. In some embodiments, context words might be limited to words that are within a certain number of characters or within a certain number of words away from the terms in the bilingual term pair. Overlap between the identified context terms can be indicative that the bilingual term pair is a translation pair, which is also indicative of the candidate pattern associated with that bilingual term pair being a valid pattern.

Another example of a feature that might be used to indicate a valid or invalid pattern is one-to-one correspondence. For example, if one bilingual term pair has an English term and a first Chinese term and a second bilingual term pair has the same English term with a different Chinese term, then the pattern is likely invalid because, presumably, most terms only have a single unique translation as opposed to having multiple translations. A high number or high percentage of bilingual term pairs not having one-to-one correspondence can be indicative of an invalid pattern.

Based on features such as those described above, a maximum entropy model can be used to estimate the probability that a candidate pattern is a valid pattern based on the one or more features identified or not identified for each candidate pattern. The maximum entropy model can compute a probability for each candidate pattern based on the detected features and based on weightings for the various features, and the candidate pattern with the highest probability can be selected to be the best pattern for translation extraction for a particular bilingual webpage. In determining the probability of a candidate pattern being valid, not all features need to be given equal weight. For example, a set of bilingual term pairs comprising a high number of known translation pairs might be weighted more heavily than other features.

While all of the examples of features provided above, as well as feature types not disclosed, could be used for determining valid patterns and for selecting one or more patterns for extracting candidate translation pairs, some embodiments will only use a subset of the features described above. For example, in a system configured to return translations for OOV terms in real time, features that are more computationally expensive to identify might not be included in order to increase the speed at which a translation can be returned.

Validation of the Set of Candidate Translation Pairs

After the best pattern has been selected based on the features, the selected pattern can be used to identify a set of candidate translation pairs by identifying bilingual term pairs with patterns that match the selected pattern.

Each candidate translation pair can be verified to determine if that particular candidate translation pair should be discarded or treated as a correct translation pair. In some instances, only the individual candidate translation pairs that fail verification will be discarded. For example, a selected pattern might identify only a small number of candidate translation pairs that fail verification. This small number might be because the author of the webpage transcribed a portion of the page incorrectly or because terms not intended to be translations happen to match the selected pattern.

In other instances, more than a threshold number or more than a threshold percentage of candidate translation pairs failing verification might cause the entire set of candidate translation pairs to be discarded. For example, a high number of candidate translation pairs failing verification might indicate that the selected candidate pattern, even if the best pattern available, is still not a valid pattern.

The candidate translation pairs can be verified using the same techniques described above in reference to the features used to rank candidate patterns. For example, as described above, average translation probability can be used to determine if a candidate pattern appears to be valid. Candidate translation pairs extracted from that pattern can then be individually verified using translation probability. In an example where ninety-eight out of one hundred bilingual term pairs of a particular pattern have high translation probabilities, and two out of one hundred bilingual term pairs have low translation probability, the average translation probability for the particular pattern will be high, indicating the pattern is likely valid. Even if the particular pattern is the best pattern and is used to extract candidate translation pairs, some extracted candidate translation pairs might still be inaccurate. Verifying the individual candidate translation pairs allows these inaccurate translation pairs to be discarded from the group of mostly accurate candidate translation pairs.

As another example, if ninety-six out of one hundred bilingual term pairs matching a particular candidate pattern have one-to-one correspondence, then that particular candidate pattern could be selected to use in extracting candidate translation pairs. During verification, the four out of one-hundred candidate translation pairs not having one-to-one correspondence can be discarded and not treated as a correct translation pairs.

Transliteration score, length similarity, web co-occurrence, context similarity, and numerous other verification techniques can also be implemented in manners similar to the translation probability and one-to-one correspondence examples provided above. The features used in the verification techniques may be the same as the features used to select patterns, but in some embodiments, depending on design preferences, one or more of the verification techniques might not be used in identifying features for selecting patterns and only used in verifying candidate translation pairs.

Transliteration score, length similarity, web co-occurrence, context similarity, and numerous other verification techniques can also be implemented in manners similar to the translation probability and one-to-one correspondence examples provided above. The features used in the verification techniques may be the same as the features used to select patterns, but in some embodiments, depending on design preferences, one or more of the verification techniques might not be used in identifying features for selecting patterns and only used in verifying translation candidate pairs.

Candidate translation pairs that pass verification can be identified as translation pairs. Depending on the system implementing the techniques described herein, translation pairs might be returned to a user in response to a query, used to build a database of known translations, or used in any number of applications that benefit from translating OOV terms.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
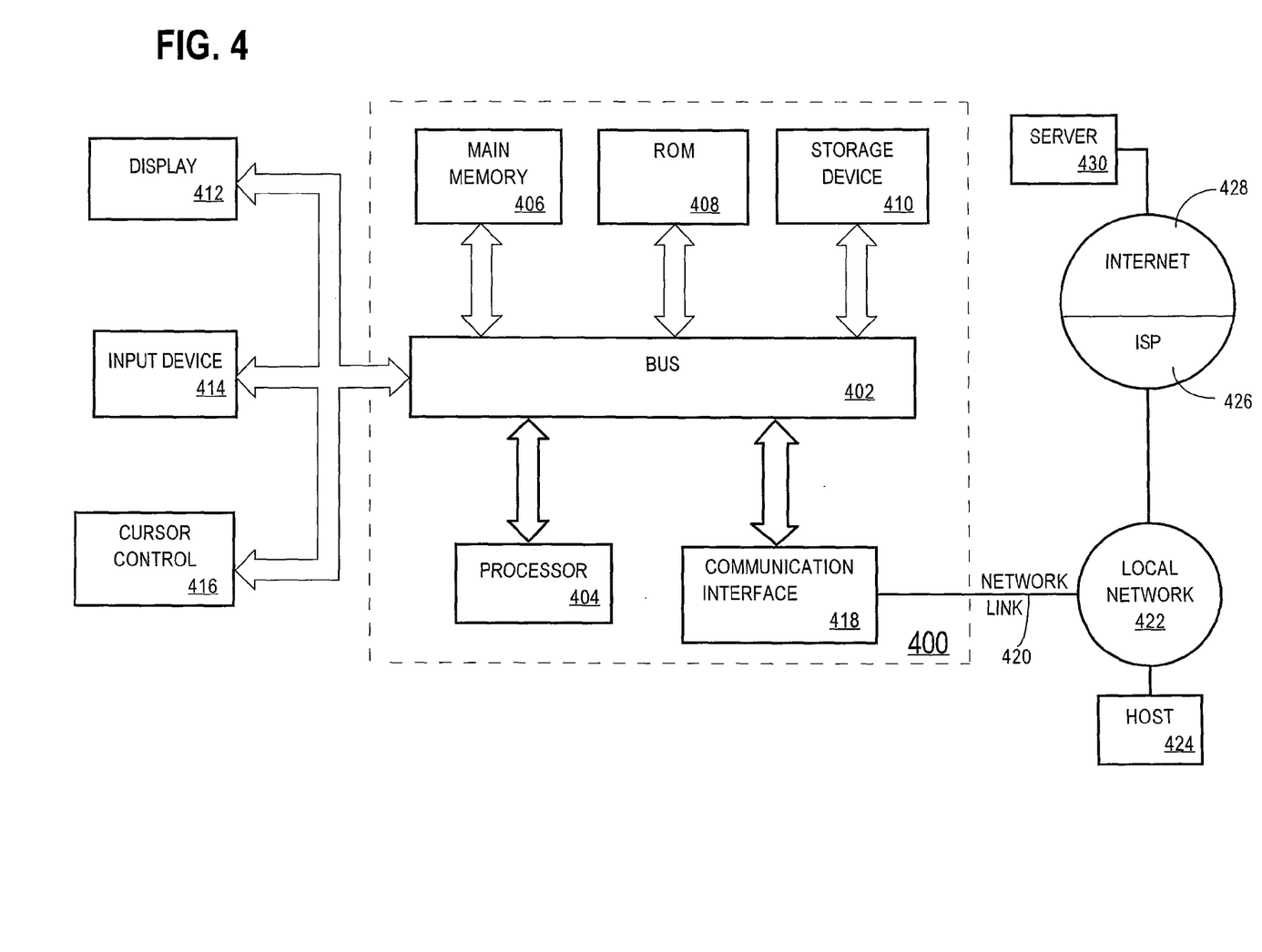
FIG. 4 shows a block diagram of a computer system on which techniques of the present disclosure could be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   identifying, within a bilingual webpage, a set of one or more bilingual term pairs, wherein a bilingual term pair comprises a first term in a first language and a second term in a second language;
   based at least in part on a layout of the one or more bilingual term pairs in the bilingual webpage, identifying a plurality of candidate patterns;
   identifying, for each candidate pattern of the plurality of candidate patterns, one or more features;
   based at least in part on the one or more features of each candidate pattern, selecting a first candidate pattern from the plurality of candidate patterns;
   after selecting the first candidate pattern, identifying a set of candidate translation pairs that match the first candidate pattern within the bilingual webpage and that were not previously identified within the bilingual webpage before selecting the first candidate pattern;
   wherein the method is performed by one or more special-purpose computing devices.

2. The method of claim 1 further comprising:
   performing a verification operation on a candidate translation pair from the set of candidate translation pairs;
   based, at least in part, on results of the verification operation, determining whether to classify the candidate translation pair as a translation pair.

3. The method of claim 2, further comprising determining that no candidate translation pairs should be classified as translation pairs in response to more than a threshold number of candidate translation pairs not passing the verification operation.

4. The method of claim 2, wherein performing a verification operation on the candidate translation pair comprises determining if the candidate translation pair has a one-to-one correspondence relative to other candidate translation pairs.

5. The method of claim 1, wherein identifying the one or more candidate patterns comprises:
   identifying a first bilingual term pair;
   assigning a first generic token to a first term of the bilingual term pair;
   assigning a second generic token to a second term of the bilingual pair;
   assigning a non-generic token to a term or tab between the first term and the second term; and
   identifying, based on a layout pattern of the first generic token, the second generic token, and the non-generic token, a first candidate pattern.

6. The method of claim 5, further comprising:
   assigning a third generic token to a term or tab before or after the first bilingual pair term; and
   identifying, based on a layout pattern of the first generic token, the second generic token, the third generic token and the non-generic token, the first candidate pattern.

7. The method of claim 5, wherein a second bilingual term pair matches the first candidate pattern if tokens corresponding to the second bilingual term pair match tokens corresponding to the first bilingual term pair.

8. The method of claim 1, wherein the one or more features comprise identifying bilingual term pairs that are known to be translations.

9. The method of claim 1, wherein the one or more features of each candidate pattern are used to determine a rank for the one or more candidate patterns, and wherein selecting the first candidate pattern is based at least in part on the rank.

10. A non-transitory computer-readable medium storing one or more instructions which, when executed by one or more processors, cause the one or more processors to perform:
    identifying, within a bilingual webpage, a set of one or more bilingual term pairs, wherein a bilingual term pair comprises a first term in a first language and a second term in a second language;
    based at least in part on a layout of the one or more bilingual term pairs in the bilingual webpage, identifying a plurality of candidate patterns;
    identifying, for each candidate pattern of the plurality of candidate patterns, one or more features;
    based at least in part on the one or more features of each candidate pattern, selecting a first candidate pattern from the plurality of candidate patterns;
    after selecting the first candidate pattern, identifying a set of candidate translation pairs that match the first candidate pattern within the bilingual webpage and that were not previously identified within the bilingual webpage before selecting the first candidate pattern.

11. The non-transitory computer-readable medium of claim 10, further comprising:
    performing a verification operation on a candidate translation pair from the set of candidate translation pairs;
    based, at least in part, on results of the verification operation, determining whether to classify the candidate translation pair as a translation pair.

12. The non-transitory computer-readable medium of claim 11, further comprising determining that no candidate translation pairs should be classified as translation pairs in response to more than a threshold number of candidate translation pairs not passing the verification operation.

13. The non-transitory computer-readable medium of claim 10, wherein identifying the one or more candidate patterns comprises:
    identifying a first bilingual term pair;
    assigning a first generic token to a first term of the bilingual term pair;
    assigning a second generic token to a second term of the bilingual pair;
    assigning a non-generic token to a term or tab between the first term and the second term; and identifying, based on a layout pattern of the first generic token, the second generic token, and the non-generic token, a first candidate pattern.

14. The non-transitory computer-readable medium of claim 13, further comprising:
assigning a third generic token to a term or tab before or after the first bilingual pair term; and
identifying, based on a layout pattern of the first generic token, the second generic token, the third generic token and the non-generic token, the first candidate pattern.

15. The non-transitory computer-readable medium of claim 13, wherein a second bilingual term pair matches the first candidate pattern if tokens corresponding to the second bilingual term pair match tokens corresponding to the first bilingual term pair.

16. The non-transitory computer-readable medium of claim 10, wherein the one or more features comprise identifying bilingual term pairs that are known to be translations.

17. The non-transitory computer-readable medium of claim 10, wherein the one or more features of each candidate pattern are used to determine a rank for the one or more candidate patterns, and wherein selecting the first candidate pattern is based at least in part on the rank.

18. The non-transitory computer-readable medium of claim 10, wherein performing a verification operation on the candidate translation pair comprises determining if the candidate translation pair has a one-to-one correspondence relative to other candidate translation pairs.

19. An apparatus comprising:
one or more processors;
logic coupled to the one or more processors and configured to:
identify, within a bilingual webpage, a set of one or more bilingual term pairs, wherein a bilingual term pair comprises a first term in a first language and a second term in a second language;
based at least in part on a layout of the one or more bilingual term pairs in the bilingual webpage, identify a plurality of candidate patterns;
identify, for each candidate pattern of the plurality of candidate patterns, one or more features;
based at least in part on the one or more features of each candidate pattern, select a first candidate pattern from the plurality of candidate patterns;
after selecting the first candidate pattern, identify a set of candidate translation pairs that match the candidate pattern within the bilingual webpage and that were not previously identified within the bilingual webpage before selecting the first candidate pattern.

20. The apparatus of claim 19, further configured to:
perform a verification operation on a candidate translation pair from the set of candidate translation pairs;
based, at least in part, on results of the verification operation, determine whether to classify the candidate translation pair as a translation pair.

* * * * *